United States Patent
Chaudhuri et al.

(10) Patent No.: US 7,920,484 B1
(45) Date of Patent: Apr. 5, 2011

(54) CONTROL OF OPTICAL CONNECTIONS IN AN OPTICAL NETWORK

(75) Inventors: Sid Chaudhuri, East Brunswick, NJ (US); Gisli Hjalmtysson, Audubon, PA (US); Jennifer Yates, Madison, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 772 days.

(21) Appl. No.: 11/233,209

(22) Filed: Sep. 22, 2005

Related U.S. Application Data (63) Continuation of application No. 09/769,780, filed on Jan. 26, 2001, now Pat. No. 7,031,299.

(60) Provisional application No. 60/178,726, filed on Jan. 28, 2000.

(51) Int. Cl.
H04L 12/66 (2006.01)
H04L 12/28 (2006.01)
(52) U.S. Cl. .................................... 370/254; 370/352
(58) Field of Classification Search .................. 370/351, 370/352, 389
See application file for complete search history.

(56) References Cited

U.S. PATENT DOCUMENTS
5,781,537 A * 7/1998 Ramaswami et al. ........ 370/254

OTHER PUBLICATIONS
Puneet Sharma, Deborah Estrin, Sally Floyd, Van Jacobson, "Scalable Timers for Soft State Protocols" 1997, IEEE, whole document.*

* cited by examiner

Primary Examiner — Chirag G Shah
Assistant Examiner — Srinivasa R Reddivalam (57) ABSTRACT

A method for lightpath provisioning in a reconfigurable optical network that comprises the steps of naming each network addressable element in the reconfigurable optical network, determining current resources therein, determining current topology therein, requesting establishment of a lightpath, and allocating the lightpath. A system for lightpath provisioning in a reconfigurable optical network is also provided, which includes naming each network addressable element in the reconfigurable optical network, determining current topology in the reconfigurable optical network, determining current resources in the reconfigurable optical network, requesting establishment of a lightpath, allocating the lightpath and removing the lightpath upon completion.

8 Claims, 6 Drawing Sheets

Figure 1. Example optical network illustrating defined network elements

Figure 2. Example addressing scheme in the optical network.

CONTROL OF OPTICAL CONNECTIONS IN AN OPTICAL NETWORK

This application is a continuation of prior application Ser. No. 09/769,780 filed Jan. 26, 2001 now U.S. Pat. No. 7,031,299, which claims the benefit of U.S. Provisional Application No. 60/178,726, filed on Jan. 28, 2000, both of which are incorporated herein by reference.

FIELD OF INVENTION

The invention relates generally to optical communications and particularly to a method and system for the control and management of lightpaths in a reconfigurable optical network and for service restoration in the event of a failure, thereby improving network performance.

BACKGROUND OF THE INVENTION

The Internet is replacing the traditional telephone network as the ubiquitous network infrastructure. With its simple network interface and global reach, the Internet is already the target of almost all new network services. While experts debate on the exact growth rate of traffic volumes on the Internet, even by the most conservative estimates, packetized IP traffic will constitute more than 95% of all network traffic within two to three years. This ever-increasing demand by consumers for greater bandwidth translates to a requirement for increased system performance. Moreover, while traditional network services continue to grow at moderate rates, all indicators predict that the much higher growth rate of Internet traffic will continue. While network operators will continue to offer service interfaces beyond IP, the inevitable and absolute dominance of IP traffic makes prudent engineering practices dictate that the network infrastructure should be optimized for IP.

However, the continuing high growth rate of Internet traffic volumes is becoming one of the Internet's most challenging scalability problems. Fiber optics using Wavelength Division Multiplexing (WDM) offers the enormous capacity that the Internet requires to continue to grow. In addition, the increasing agility of the latest Optical Layer Cross-connects (OLXCs) offers, for the first time, the ability to dynamically change the optical layer connectivity on small time scales.

OLXCs switch high bandwidth traffic. An OLXC may comprise all optical switching, or electronic switching. At the present time all optical switching does not have the ability to perform wavelength conversion. All optical cross connects may, however, change the wavelength electronically or, on the future, via all optical wavelength converters. Opto-electronic and all electronic switching perform wavelength conversion. It is important to note that OLXCs may use Time Division Multiplexing (TDM) or Wavelength Division Multiplexing (WDM). For example, an OLXC may support WDM systems with SONET framing (OC-192 bit streams) on each wavelength, switching at OC-48 granularity.

There is an underlying conflict, however, between the typical datagram (connectionless) service that supports the best-effort data delivery of the Internet and virtual circuit (connection-based) service. This conflict is exacerbated in the world of optical networks. This is due to the fixed nature of the wavelengths available and the restoration of service in optical networks.

Optical networks are connection oriented and designed for fixed rate bit streaming with very low error rates. Whereas the Internet employs soft state where possible, the state of the optical infrastructure that is encoded in its OLXCs, is hard and must be explicitly removed. The key elements in the success of the Internet have been its simplicity and the flexibility of the Internet service model. The challenge in leveraging the new optical capabilities to enhance the Internet and other services is to manage the optical resources efficiently, without sacrificing the simplicity and flexibility of the Internet.

In spite of most traffic and media types becoming IP based, high-bandwidth optical connections referred to as lightpaths will continue to be of value. Aggregate loads between major metropolitan areas are rather stable, with most of the achievable statistical multiplexing already attained in the regional and collection (distribution) part of the network. With electronic switching stretched to the limit to cope with regional network volumes, this load can conveniently be assigned to point-to-point lightpaths that bypass intermediate backbone routers, reducing their load and reducing end-to-end delay and delay variation. Traffic engineering, i.e., load and quality management, is increasingly performed by adjusting connectivity and capacity between major backbone gateways on a relatively large time-scale, still small compared to the time-scale of provisioning. This is both the primary function and the reason that ATM or Multi-Protocol Label Switching (MPLS) is being employed below the IP layer by most network operators. Agile, dynamically configurable OLXCs allow the use of the optical layer to directly implement these functions, avoiding having ATM or MPLS as intermediate layers in future networks. Lastly, lightpaths carrying transit traffic, or non-IP traffic, will remain a significant source of revenue for network operators for many years. Whereas much of the transit capacity may carry IP traffic, operators leasing optical capacity may choose not to disclose this.

There are issues involving networks in general as they relate to where particular service and intelligence are provided. For example, a connectionless network layer is used for the Internet but ATM networks have a connection-oriented network layer. Trying to run the Internet over an ATM network leads to redundancy of service at the transport layer which, for example, re-orders out-of-order packets as does the ATM layer. This is inefficient at best.

Routing algorithms are another problem. Some networks use adaptive routing algorithms and some use non-adaptive routing algorithms. Non-adaptive routing algorithms are those routing algorithms that are static and do not adjust based on the traffic, queuing delays or environmental conditions such as failed components. Connection-oriented service falls into this category for the most part. Adaptive routing algorithms are dynamic and adjust to traffic, queuing delays or environmental conditions. Datagram service in which packets do not necessarily travel the same route from source to destination are easily adjusted based on traffic, delays and environmental conditions.

This points also to issues as to where the failure or failover mechanisms lie and the response time to invoke such mechanisms. Because of the nature of datagram service, a failed component (e.g. a router) is easily overcome by re-routing. On the other hand, a similarly failed component in a connection-oriented network would lose all connections that passed through that component and even worse, it might take a significant amount of time for the source to discover the failure.

In order to prepare for the future, which will surely involve optical Internetworking, these and many other issues need to be resolved. Optical Internetworking will be a part of the future based on the amount of bandwidth that consumers are demanding.

SUMMARY OF THE INVENTION

An approach for optical bandwidth management in a dynamically reconfigurable optical network is described. The optical network consists of optical layer cross-connects (OLXCs) that switch high-speed optical signals (e.g. OC-48, OC-192) from input ports to output ports. These OLXCs are interconnected via WDM and/or TDM links. The OLXCs may be purely optical or electrical or a combination. The network is assumed to be within a single domain of authority (or trust).

Every node in the network consists of an IP router and an OLXC. In general, the router may be traffic bearing, or it may function purely as a controller for the optical layer and carry no IP data traffic. The node may be implemented using a standalone router interfacing with the OLXC through a defined interface, or may be an integrated system, in which case the router is part of the OLXC system. The policies and mechanisms described herein for optical bandwidth management and restoration are applicable whether the router carries data or not. U.S. patent application Ser. No. 09/685,952 entitled "A Recovery Method for a Network" filed Oct. 12, 2000, and U.S. patent application Ser. No. 09/685,953, entitled "Method and Apparatus for Routing Information Over Optical Pathways" filed Oct. 12, 2000, are also incorporated herein by reference.

In the networks considered, it is assumed that the physical hardware is deployed, but that network connectivity is not defined until lightpaths are established within the network. A lightpath is a constant bit-rate data stream connected between two network elements such as IP routers.

Lightpaths may be requested by client IP aware network elements, or by external operations systems used for IP-ignorant network elements. Such requests may be for unidirectional or bidirectional lightpaths of a given bandwidth and with specified restoration requirements. The lightpaths are provisioned by choosing a route through the network with sufficient available capacity. The lightpath is established by allocating capacity on each link along the chosen route, and appropriately configuring the OLXCs. Restoration is provided by reserving capacity on routes that are physically diverse to the primary lightpath.

It is an object of this invention to provide a method and system for managing an optical network.

It is a further object of this invention to describe a smart router with simple optics and an enhanced IP layer as the basis for a novel combination IP router and OLXC.

It is further an object of this invention to describe a method and system for restoration of service in the event of a failure in a fiber or set of fibers that have a shared risk of failure. In particular, it is an object of this invention to efficiently restore network service by pre-reserving bandwidth along routes that are physically diverse from the primary routes.

Yet another object of the present invention is to use a "soft-state" mechanism to maintain a connection.

It is an object of the present invention as well to restore a primary lightpath after repairs have been effected.

BRIEF DESCRIPTION OF THE DRAWINGS

The invention is best described with reference to the detailed description and the following figures, where.

DETAILED DESCRIPTION OF THE PREFERRED EMBODIMENTS

Figure 1:
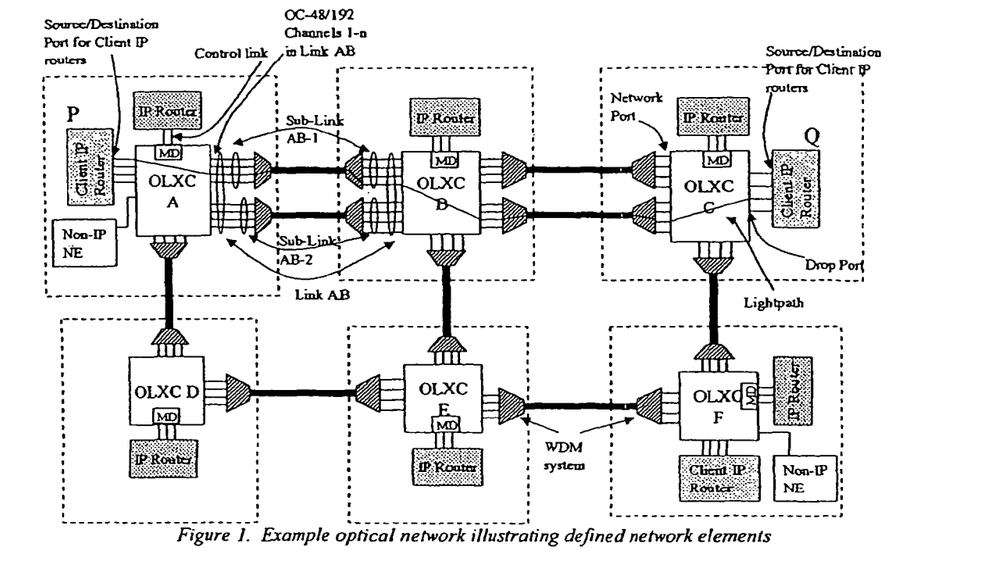
FIG. 1 illustrates an optical network with multiple optical layer cross-connects (OLXCs) interconnected via WDM links.

FIG. 1 illustrates an optical network with multiple optical layer cross-connects (OLXCs) interconnected via WDM links. Each node in this network consists of an IP router and a dynamically-reconfigurable OLXC. Optical lightpaths are established between network elements, via OLXCs. In FIG. 1 these network elements are client IP routers, illustrated at P and Q. A channel (or multiple channels) is chosen on each of the links along the route chosen for establishing a lightpath. Provisioning a lightpath is like establishing a connection using a connection setup mechanism. That is, a lightpath is like a virtual circuit.

In order to facilitate the description of the present invention the following network objects (also illustrated in FIG. 1) are defined. A Wavelength Division Multiplexer (WDM) is a system, which takes multiple optical inputs, converts them into narrowly spaced wavelength optical signals within an optical amplification band and couples them onto a single fiber. The amplified signal is received at the receive end, demultiplexed and potentially converted to multiple channels of standard wavelength to interface with other equipment. It is, however, possible to take the wavelength specific signals directly as the inputs. In that case, no wavelength conversion is necessary at the WDM system. The WDM system may or may not be integrated with an OLXC.

A channel is a unidirectional optical tributary connecting two OLXCs. Multiple channels are multiplexed optically at the WDM system. One direction of an OC-48/192 connecting two immediately neighboring OLXCs is an example of a channel. A single direction of an Optical channel (Och) as defined in ITU-T G.872 between two OLXCs over a WDM system is another example of a channel. A channel can generally be associated with a specific wavelength in the WDM system. However, in a WDM system with transponders, the interfaces to the OLXC would be a standard single color (1310 or 1550 nm). Additionally, a single wavelength may transport multiple channels multiplexed in the time domain. For example, an OC-192 signal on a fiber may carry four STS-48 channels. For these reasons, a channel is defined separately from wavelength although in most applications there is a one-to-one correspondence.

An OLXC is a switching element, which connects an optical channel from an input port (or channel) to an output port (or channel). Specifically, an input port for a given or current node is connected to an output port at the current or given node. Further, the output port of the current node is selected as an input port at a next node. These devices are also often referred to as optical cross-connects (OXC). Note that an optical add-drop multiplexor (OADM) is viewed here as a simple OLXC. The switching fabric may be either electronic or optical. If the switching fabric is electronic, then switching would occur at a given channel rate, but the interface ports may in fact be at higher rates (i.e. time-division multiplex multiple channels onto a single wavelength). This is important to note because of the multiplexing function assumed in the OLXC. That is, lightpaths are not restricted to be identical to the Och defined in ITU-T G.872. If the WDM systems contain transponders or if electronic OLXCs are used, then it is implied that a channel associated with a specific wavelength in the WDM input can be converted to an output channel associated with a different wavelength in the WDM output (i.e. wavelength conversion is inherent). However, if the switching fabric is optical and there is no transponder function in the WDM system, then wavelength conversion is only implemented if optical to electronic conversion is performed at the input or output ports, or if optical wavelength converters are introduced to the OLXC. Also, it is assumed that Time Division Multiplexing (TDM) is not offered within an all-optical OLXC.

All channels in a given direction connecting a particular pair of OLXCs and routed along the same physical route constitute a link. As shown in FIG. 1, the channels on the WDM from OLXC A to OLXC B form the Link AB if they are routed on the same physical links. If route diversity is implemented between two OLXCs, then multiple links may exist between the same OLXCs. Note that links defined in this way are unidirectional. There can be multiple WDMs within a link. A single WDM can be divided into multiple links (i.e. between different OLXCs). The link is thus not necessarily a union of WDMs, and there is not necessarily a one-to-one correspondence between WDM systems and links.

A fiber span consists of a collection of fiber cables that are located in the same conduit or right of way. If there is a cut in the fiber span, then failures would potentially be experienced on all fibers within the fiber span. For restoration and diverse routing purposes it may be necessary to associate links within a fiber span in a Shared Risk Link Group (SRLG). A SRLG is a union of all links that ride on a fiber span. Links may traverse multiple fiber spans, and thus be in multiple SRLGs. U.S. patent application Ser. No. 09/714,970 entitled "System and Method for Auto Discovery of Risk Groups in an Optical Network" filed Nov. 20, 2000, is incorporated herein by reference.

A drop port is an OLXC port that connects to the end client network element (NE). The drop interface connects the client port to the OLXC drop port. This is essentially a User Network Interface (UNI) connecting the end devices to the optical layer. The drop port terminates the user network interface between the client network element (NE) and the optical network. It is necessary to distinguish this type of interface from others to identify network requests originating from a client NE.

A network port is an OLXC port not directly interfacing with an end client NE. A Network Port in an OLXC would always interface with another Network Port via a WDM system or directly via optical fibers.

The elementary abstraction of optical layer connectivity between two end points is a unidirectional lightpath. A lightpath is a fixed bandwidth connection between two NEs established via the OLXCs. An example is one direction of an OC-48/STM-16 (2.5 Gbit/s) or an OC-192/STM-64 (10 Gbit/s) established between two client routers through the OLXCs with or without Multiplex/regenerator Section Overhead termination. A bidirectional lightpath as defined herein consists of two associated lightpaths in opposite directions routed over the same set of nodes. A lightpath PABCQ is shown in FIG. 1. Note that if the OLXC is an electronic SONET/SDH line terminating equipment, the entire path need not be OC-48 for an OC-48 path. For example, the channel in link AB may be an OC-192 that carries the OC-48 payload of the lightpath. Note that an OC-N and Och are by definition bidirectional, while lightpaths are defined herein to be unidirectional by default (anticipating asymmetric loads). Therefore, it is assumed that independent lightpaths in opposite directions may use a bidirectional OC-48 or Och span.

A source can be a client router physically connected to an OLXC by one or more OC-48/192 interfaces. A source can also be a non-IP NE connected to the OLXC via an OC-48/192 interface. In the case of an IP router source, the router will have an IP address and the physical interfaces to the OLXC are identified with some set of addresses (potentially a single IP address, or a unique address per port). In the case of a non-IP NE, either the NE will be assigned an IP address, or the OLXC port connecting the NE will have an IP address. For non-IP aware equipment interfacing the OLXC, any connection request must be originated externally via "craft" or external OS interfaces. "craft" is an interface by which external users can control the "box" (OLXC). An example is a commend line interface, where a user enters commands to the "box" (e.g., connect input port A to output port B). This is accomplished using a defined protocol such as Transaction Language 1 (TL1). In the alternative, as opposed to a user entering commands, the "box" may be controlled by a program on an external PC or any other automated device or system. The destination is essentially the same as the source from the physical interface perspective. When a request is generated from one end, the other end client or end OLXC interface becomes the destination.

A first-hop router is the first router within the domain of concern along the lightpath route. If the source is a router in the network, it is also its own first-hop router. Where an external client interfaces to a network node, the router associated with that network node is then the first-hop router. A last-hop router is the last router within the domain of concern along the lightpath route. If the destination is a router in the network, it is also its own last-hop router. The first-hop router as used and described herein has the responsibility of managing all lightpaths for which it is the first-hop router.

A mediation device is a vendor specific controller used to control the OLXC. The mediation device provides the interface between external sources and the OLXC, translating logical primitives to and from the proprietary controls of the OLXC. If the router is integrated with the OLXC, then the mediation device is merely a function within the integrated entity, and not an explicit device.

The salient feature of the network architecture is that every node in the network consists of an IP router and a dynamically reconfigurable OLXC. The IP router is responsible for all non-local management functions, including the management of optical resources, configuration and capacity management, addressing, routing, traffic engineering, topology discovery, exception handling and restoration. In general, the router may be traffic bearing or it may function purely as a controller for the optical network and carry no IP data traffic. The mechanisms and requirements described herein are applicable regardless of whether data traffic traverses through the routers or not. Although the IP router performs all management and control functions, lightpaths may carry arbitrary types of traffic.

The IP router implements the necessary IP protocols and uses IP for signaling to establish and maintain lightpaths. Specifically, optical resource management requires resource availability per link to be propagated, implying link state protocols such as Open Shortest Path First (OSPF). OSPF propagates Link State Advertisements that describe the existence/characteristics of each link. Each router advertises the links associated with itself, and receives advertisements from all other routers. Thus, each router will eventually end up with a representation of the entire network topology. In traditional, IP only OSPF, OSPF also uses a shortest path algorithm at each node to calculate the next hop along the route. Because all routers are using the same topology and the same shortest path algorithm, packets will end up at their destination. If a node has the wrong topology, or uses the wrong algorithm, routing loops could occur.

For purposes of the present invention, the shortest path routing feature of OSPF is not being used for managing optical connectivity. The present invention uses OSPF or similar IP-based routing protocols to propagate information about optical network resources. An arbitrary algorithm is then used at the first-hop router (e.g., an adaptive routing algorithm) to calculate the lightpath route for each new request.

While OSPF is assumed, other link state algorithms, for example Intermediate-Systems-to-Intermediate-Systems (IS-IS), may be equally applicable. PNNI is a routing information protocol that enables extremely scaleable, full function dynamic multi-vendor ATM switches to be integrated in the same network.

Each network node is connected to other nodes by one or more lightpaths. That is, a node may be connected to one or more other nodes by one or more lightpaths. For example, in FIG. 1, node A is connected to both nodes B and D with two lightpaths. The physical implementation of the lightpath uses either fixed or tunable lasers. On each link within the network, one channel is assigned as the default routed (one hop) lightpath. The routed lightpath provides router-to-router connectivity between adjacent nodes over this link. These routed lightpaths reflect (and are thus identical to) the physical topology. The assignment of this default-routed lightpath is by convention, e.g. the "first" channel. All traffic using this lightpath is IP traffic and is forwarded by the router. Multiple fibers using multiple channels on each link are assumed. All control messages are sent in-band on a routed lightpath as regular IP datagrams, potentially mixed with other data but with the highest forwarding priority. Control traffic may use any routed path.

A fraction of the link is reserved at any given time for restoration. The default-routed lightpath is restored on one of these channels. Therefore it can be assumed that as long as the link is functional, there is a default routed lightpath on that link. In particular, if the lightpath used for the original routed path fails, a new lightpath is assigned as the default lightpath. To establish a multiple hop lightpath, the originating node sends a create request to the destination. Routers in the path forward the request and process it by configuring their OLXCs. Once constructed, the new lightpath transparently bypasses the intermediate routers allowing the path to carry arbitrary traffic.

In resource constrained portions of the network, such as the link connecting the customer premise to the network, it may not be economically feasible to reserve a channel and the associated IP interface for the default routed lightpath. Within the network, where each link has multiple channels carrying traffic from many customers, the overhead of the routed wavelength is amortized over the channels on that link. In contrast, the link connecting the customer premise to the network may typically have only a single traffic-bearing channel. In this case, unless the routed lightpath is also used for IP data traffic, the overhead of an optical channel dedicated for control may be excessive. If electronic line terminating OLXCs are used, an alternative to dedicating an optical channel as the routed lightpath is to transport the IP datagrams within the framing overheads of the signals (e.g. SONET Multiplex and/or Regenerator Section Overhead). Moreover, when electronic line terminating OLXCs are used it is possible to alternatively use the channel overheads of the chosen lightpath channels to carry the control information.

The IP router communicates with the OLXC mediation device (MD) through a logical interface. The logical interface defines a set of basic primitives to configure the OLXC, and to enable the OLXC to convey information to the router. The mediation device translates the logical primitives to and from the proprietary controls of the OLXC. Ideally, this interface is both explicit and open. A particular realization may integrate the router and the OLXC into a single box or component and use a proprietary interface implementation. The crucial point is that this proprietary interface must still provide equivalent functionality to the interface described herein. Another important interface is the service interface between the customers and the network. This interface determines the set of services that the optical network provides.

It is important to identify the services that an optical network should offer, and the functionality that must be implemented in the optical network to support these services. The most important of these services and the subject of this invention are lightpath services and diversely routed lightpath groups.

Beyond the node local mechanisms, signaling mechanisms to construct optical lightpaths are needed. An Application Programming Interface (API) call to create a path requires at least four parameters including: destination, bandwidth, restoration flag, and a transparency flag. An API call actually generates a message. The API call to construct a lightpath generates a lightpath request message. The API call to reserve restoration capacity generates a restoration reservation message. If the restoration flag is set, the lightpath will be protected. Lightpaths without the transparency flag are assumed to carry IP services, and may be rerouted as IP traffic if needed. On completion an explicit tear down message is sent to remove the lightpath.

Lightpath services include lightpath requests between a source and destination, such as an API call with the following attributes:

Lightpath identifier: A globally unique identifier. A unique lightpath identifier can be assigned by the customer when the lightpath is requested or it can be assigned by the network when the lightpath is established.

Source address.

Destination address.

Bandwidth requirements: A limited set of bandwidth allocations are available, depending on the framing type (e.g. OC-48, OC-192).

Unidirectional or bidirectional lightpath.

Diversely routed lightpath group identifier: A globally unique group identifier defined for diversely routed lightpath groups. A convenient way to create a diversely routed lightpath group identifier is by concatenating the IP address of the first-hop router, and a sequence number unique at the router. If the diversely-routed lightpath group is not coordinated by the first-hop router but instead by an external operations system, the address of the coordinating entity would be used instead.

Restoration class: One of (i) restored by optical layer, (ii) restored by IP layer, (iii) not restored, (iv) not restored and preemptable. For Class (i), the lightpath must be restored using another lightpath (optical layer restoration). IP restored (Class (ii)) assumes that the traffic transported on the lightpath is IP, and may be restored by routing through the network routers if needed and given that routing capacity is available.

Security object—for authentication.

Wavelength rearrangeability—optional parameter required only for client/network interfaces without wavelength conversion. This parameter describes whether or not the restoration wavelength may be different to the primary wavelength (i.e. whether the interface wavelength can be retuned after failure).

Diversely routed lightpath groups are a set of diversely routed non-restored lightpaths so that for any single failure, at most a given number of lightpaths out of the group fail. The lightpaths of a group may potentially have different sources and destinations.

To cope with decreasing provisioning time scales, and to enhance scalability, it is necessary to maintain the network state in a distributed manner. This need drives most other system requirements and implementation choices, and the service requirements above imply the need for the following information and algorithms:

An addressing and naming scheme.

Algorithms and mechanisms for the allocation of bandwidth resources to new lightpaths, and for the reservation of restoration capacity. These algorithms and mechanisms must be able to support diversely routed lightpaths as described above.

Information regarding the current resource allocations must be propagated throughout the network. For scalability, details of individual wavelength allocations are not distributed.

Algorithms and mechanisms for fault detection and recovery (i.e., notification and exception handling).

Algorithms for the management and optimizations of resource allocation; and the minimization of resources reserved for restoration. Established lightpaths may occasionally be reconfigured to optimize resource allocations.

Information on topology and inventory of physical resources (e.g. channels). Information about SRLGs, which is necessary for routing of restoration lightpaths, and for diverse routing of primary lightpaths.

Algorithms for distributed state maintenance of the above.

Specification of interfaces between the user and the network.

Specification of interfaces between the router and the OLXC mediation device.

Figure 2:
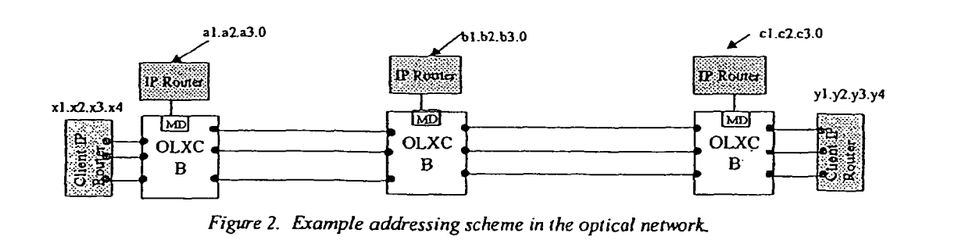
FIG. 2 depicts an addressing scheme in an optical network.

Looking first at addressing mechanisms, every network addressable element must have an IP address. These elements include each node and potentially every optical link and IP router port. These IP addresses must be globally unique if the element is globally addressable. An example of how these IP addresses could be assigned is given in FIG. 2. Each IP router is assigned an IP address of the form a1.a2.a3.0, where a1, a2, a3>0. The OLXC links are then assigned a unique IP address of the form a1.a2.a3.x, where x>0.

Local naming schemes can be used to identify channels within fibers, or to identify fibers within links. However, globally unique names will be required to specify routes through the network. A possible naming convention for uniquely identifying the channels used along a route through a network, is to identify a channel according to the OLXC from which it is sourced. How these values are used depends on what elements are assigned IP addresses. If only the OLXC has a unique IP address, then the naming scheme uses a pre-defined convention to identify links and channels within the OLXC (i.e. OLXC IP address: link number: channel number). Alternatively, if the link is also assigned an IP address, then the channel is uniquely defined by the link IP address, (i.e. link IP address: NULL identifier: channel number). The NULL identifier is used to indicate that a given field is invalid. For example, in the identifier associated with the link IP address, the second field contains a NULL identifier, which is used to indicate that a link number is not required, because the IP address corresponds to a unique link. Thus, the first non-NULL identifier can be used to denote what the IP address corresponds to (i.e. OLXC or link). The same applies for addresses assigned at finer granularities, e.g., for each channel. It is assumed that for each link the channels are enumerated from 1 to the number of channels. Clearly, other variants on the above naming scheme are possible.

A client must also have an IP address by which it is identified. However, optical lightpaths could potentially be established between devices that do not support IP (i.e. are not IP aware), and consequently do not have IP addresses. This could be handled by either assigning an IP address to the device, or alternatively assigning an address to the OLXC port to which the device is attached. Whether or not a client is IP aware can be discovered by the network using traditional IP mechanisms.

Abstractly, an IP tunnel is simply an association between the two tunnel ends. Datagrams enter the tunnel at the entry. At the other end the datagrams exit the tunnel and become indistinguishable from the original datagram. Classical IP tunnels are implemented using encapsulation of the IP packet with a new IP header.

The first-hop router receives a request to create a lightpath from a source. The first-hop router creates a lightpath setup (connection) message and sends it towards the destination of the lightpath where it is received by the last-hop router. If the originator of the request is not the source, the originator tunnels the request to the first-hop router. The lightpath setup is sent from the first-hop router on the default-routed lightpath as the payload of a normal IP packet with router alert. A router alert ensures that the packet is processed by every router in the path. A channel is allocated for the lightpath on the downstream link at every node traversed by the setup message. The identifier of the allocated channel is written to the setup message, which is then sent to the next node along the selected route. If no channel is available on some link, the setup fails, and a message is returned to the first-hop router informing it that the lightpath cannot be established. A message such as "destination not reachable" ICMP (Internet Control Messaging Protocol) message could be used for this, but any comparable mechanism would suffice. For example, if all routers are MPLS capable one could use the appropriate RSVP (Resource ReSerVation Protocol) or CR-LDP (Constraint-based Routing-Label Distribution Protocol) message. If the setup fails, the first-hop router issues a release message to release resources allocated for the partially constructed lightpath. Upon failure, the first-hop router may attempt to establish the lightpath over an alternate route, before giving up on satisfying the original request. Note that the lightpath is established over the links traversed by the lightpath setup packet. After a channel has been allocated at a node and the setup message has been sent on to the next node along the route, the router communicates with the OLXC to reconfigure the OLXC to provide the desired connectivity.

After processing the setup message, the destination (or the last-hop router) returns an acknowledgement to the source. The acknowledgment indicates that a channel has been allocated on each hop of the lightpath. It does not, however, confirm that the lightpath has been successfully implemented (i.e. the OLXCs have been reconfigured). It is desirable to have the acknowledgement confirm that every hop has completed the OLXC configuration. However, to verify that end-to-end connectivity has been established requires that additional mechanisms be implemented. These could be, for example, tandem connection identification verification, as defined in ITU-T SONET/SDH and OTN. In either case, the channel becomes available immediately after the request is sent, at the discretion of the user. Once established, the lightpath may carry arbitrary traffic, such as ATM, Frame Relay or TDM circuit.

If the source requests a restorable lightpath, then capacity must be reserved within the network. This is performed independently, although potentially overlapping in time, with the setup of the primary lightpath, but may take a significantly longer time. The first-hop router is responsible for ensuring that restoration capacity is reserved for all restorable failures. The first-hop router informs the source once this is completed. The establishment of a restored lightpath is completed when the primary capacity is allocated and the restoration capacity is reserved.

Managing optical connectivity requires information about the state of each lightpath. Soft state has an associated time-to-live, and may be discarded once this time has expired. The state must be refreshed to avoid expiration. In contrast, hard state remains permanently until it is explicitly deleted. The present invention may use either hard state or use soft state for network state and protocols. This applies in particular to lightpath and restoration state. Using soft state, if the state of a lightpath expires at a particular node, the state is locally removed and all resources allocated to the lightpath are reclaimed.

The primary benefit of soft state is that it simplifies exception handling through "garbage collection". In general, soft state allows for optimistic protocol design, optimized for the most common cases, and avoids overburdening the protocol specifications and implementations with exception cases. For example, soft state allows us to use "optimistic signaling", avoiding reliable delivery for lightpath setup and tear-down messages. If a message is lost, say a setup message after a partial lightpath construction, the setup fails, but no exception handling is necessary as the allocated resources will eventually time-out and be reclaimed. The same applies to lost tear-down messages. In contrast, hard state requires reliable construction and removal of state, and the correct handling of all associated failure cases. These failure cases account for the bulk of the complexity of existing signaling systems, including that of ATM. Soft state and optimistic signaling is significantly simpler, and reduces the overall complexity of the signaling system.

The soft state is used only for eventual reclaiming of resources. For higher level services the periodic refreshing of soft state is also commonly used for eventual restoration of service. This is not appropriate for fast restoration of optical connectivity. Instead, failure detection and restoration is explicit in the architecture of the present invention and independent of the soft state maintenance.

Although setup and tear-down are done optimistically and thus may be lost, measures must be taken to ensure that the likelihood of losing these messages is low. For routers supporting simple service differentiation, control messages get highest priority resulting in negligible loss rates. Even with best effort delivery of control messages, arbitrarily low signaling failure rates can be achieved by sending multiple copies of each control message sufficiently far apart to be loss independent. For example, with a one-percent loss rate of best effort traffic, two copies of each control message bring the signaling failure rate down to one in ten thousand. At 1 Gbps, sending the two copies 6000 packets apart delays the second copy by approximately 4 msec. Clearly the overhead of using two copies rather than one is negligible.

With soft state it is possible that a valid state will be prematurely removed, e.g., removing an active lightpath. The likelihood of this happening can be arbitrarily reduced by making the time-to-live some multiple of the soft state refresh intervals. This way, some number, k, of consecutive refresh messages must be lost before a valid state is removed. Refresh messages are sent far enough apart that their losses are independent. With priority forwarding of refresh messages, losses are negligible and k=3 practically eliminates this possibility. With best effort forwarding and a loss rate of one-percent, k=4 results in a probability of $10^{-8}$ of the timer expiring. With refresh messages every 30 minutes this translates into an expected time of approximately 5700 years until a given lightpath is prematurely removed.

Since the softness of the state plays no role in fast restoration, relatively long time-to-live values can be used. Long refresh periods practically eliminate the overhead of transmitting and processing refresh messages. However, if a lightpath setup or tear-down is lost, long time-to-live causes excessive times until the resources are recovered. One way to combat this is to start with a relatively short refresh period, and then increase it exponentially over time to a predefined maximum. The longer the state has survived, the fewer the number of refresh messages required. With low likelihood of signaling failures, the overhead of allocated unused resources is negligible. Other policies achieving similar efficiencies are possible. To allow flexibility in state maintenance policies the originator of a request—i.e., the owner of the state—may specify when that state will next be refreshed within a network specified upper bound. As the refresh periods become longer, the state becomes "harder". For lightpaths this implies that the source must periodically resend the lightpath request. Similarly, the first-hop router must resend the lightpath setup.

To satisfy the requirements of diverse routing and restoration, it is necessary to use explicit routing for constructing lightpaths. In addition, explicit routes may be valuable for traffic engineering and load optimizations in the network. The route on which a new lightpath is to be established is specified in the lightpath setup message. This route would typically be chosen by the first-hop router, but could be determined by a pre-authenticated higher-level network management system. Through routing protocols the first-hop router has a representation of the full physical network topology and the available resources on each link. These are obtained and updated via OSPF link state advertisements, for example. The explicit route might be carried directly in the IP datagram using the IP source route option, or carried in the packet payload as would be the case if Resource reSerVation Protocol (RSVP) were used for signaling lightpath requests. The route may be specified either as a series of nodes (routers/OLXCs), or in terms of the specific links used (as long as IP addresses are associated with these links). Numerous policies can be used to route lightpaths through the network, such as constraint-based routing algorithms. It is expected that using a good routing algorithm will produce better route selection and improve network resource utilization.

To ensure diversity in routes, each diversely routed lightpath group is coordinated by a single network entity. To create a diversely routed lightpath group, a user registers with a coordinator, and receives the group identifier. For groups originating through the same first-hop router, this router would typically act as the coordinator. To ensure diversity in routes, K SRLG and node disjoint routes through the network are selected, where K represents the number of diverse routes required. The corresponding lightpaths are then established independently. When a router receives a diversely routed lightpath request coordinated by another network entity, the router uses the address in the diversely routed lightpath group identifier to retrieve the explicit route for the new path from the coordinator. Restoration capacity is reserved such that for each link along a primary lightpath (route) there is at least one alternate route (lightpath) that is diverse from every other link within the same Shared Risk Link Group.

The construction of a bidirectional lightpath differs from the construction of a unidirectional lightpath above only in that upon receiving the setup request, the last-hop router returns the setup message using the reverse of the explicit route of the forward path. Both directions of a bidirectional lightpath share the same characteristics, i.e., set of nodes, bandwidth and restoration requirements. For more general bidirectional connectivity, a user simply requests multiple individual lightpaths.

The provisioning techniques described above apply to optical networks with wavelength conversion. However, future all-optical OLXCs may not have the ability to convert an incoming wavelength to a different outgoing wavelength (i.e. do not implement wavelength conversion). Such OLXCs may be used throughout an optical network, or may be used in only some nodes, creating all-optical sub-networks. Sections of a network that do not have wavelength converters are thus referred to as being wavelength continuous. In an optical network with wavelength conversion, channel allocation can be performed independently on different links along a route. However, if wavelength converters are not available, then a common wavelength must be located on each link along the entire route, which requires some degree of coordination between different nodes in choosing an appropriate wavelength. Whatever wavelength is chosen on the first link defines the wavelength allocation along the rest of the section. A wavelength assignment algorithm must thus be used to choose this wavelength. It is plausible, although unlikely, that wavelength conversion could also be eliminated between the client and the network. Wavelength selection within the network must be performed within this subset of client wavelengths. Very obviously wavelength continuity has a large effect on routing.

Optical non-linearities, chromatic dispersion, amplifier spontaneous emission and other factors together limit the scalability of an all-optical network. Routing in such networks will then have to take into account noise accumulation and dispersion to ensure that lightpaths are established with adequate signal qualities. For purposes of discussion, it is assumed that the all-optical (sub-)network considered is geographically constrained so that all routes will have adequate signal quality, and physical layer attributes can be ignored during routing and wavelength assignment. However, the policies and mechanisms described herein can be extended to account for physical layer characteristics. This may include alternate and new modulation methods.

One approach to provisioning in a sub-network without wavelength converters would be to propagate information throughout the network about the state of every wavelength on every link in the network. However, the state required and the overhead involved in maintaining this information would be excessive. By not propagating individual wavelength availability information around the network, a route and wavelength upon which to establish a new lightpath must be selected, without detailed knowledge of wavelength availability.

To accomplish route selection without detailed knowledge of wavelength availability, the network could be probed to determine an appropriate wavelength choice. A probe message could be used to determine available wavelengths along wavelength continuous routes. A vector of the same size as the number of wavelengths on the first link is sent out to each node in turn along the desired route. This vector represents wavelength availability, and is set at the first node to the wavelength availability on the first link along the wavelength continuous section. If a wavelength on a link is not available or does not exist, then this is noted in the wavelength availability vector (i.e. the wavelength is set to being unavailable). Once the entire route has been traversed, the wavelength availability vector will denote the wavelengths that are available on every link along the route. The vector is returned to the source OLXC, and a wavelength is chosen from amongst the available wavelengths using an arbitrary wavelength assignment scheme, such as first-fit. Note that wavelength assignment is performed here using wavelength usage information from only the links along the chosen route. Multiple lightpaths can also be simultaneously established using the same wavelength availability information. The lightpath is established by sending a lightpath setup message along the chosen route, specifying the selected wavelength.

Alternative techniques can be used for selecting a wavelength, such as attempting to establish a lightpath on successive wavelengths in turn, or simultaneously attempting to allocate the lightpath on all wavelengths that are available at the source.

The key point is that extensions of the provisioning techniques proposed in this document for optical networks with wavelength converters can be used to implement fast provisioning in networks without wavelength converters, and that the techniques for provisioning lightpaths can work together in a network with OLXCs with and without wavelength conversion.

A lightpath must be removed when it is no longer required. To achieve this, an explicit release request is sent by the first-hop router along the lightpath route. Each router in the path processes the release message by releasing the resources allocated to the lightpath, and removing the associated state. It is worth noting that when soft state is employed for lightpaths, the release message is an optimization and need not be sent reliably, as if it is lost or never issued (e.g., due to customer premise equipment failure) the softness of the lightpath state ensures that it will eventually expire and be released.

To illustrate provisioning at the optical layer, we consider an OC-48 lightpath that is to be established between client IP routers P and Q at nodes A and C, respectively, as depicted in FIG. 1. Multiple ports connect each IP router to its OLXC. In this example, SONET framing is assumed on each channel. A connection request is originated from to the source IP router (P) and sent to OLXC A over the OC-N UNI channel PA-1. The lightpath request names the desired destination client router (Q). OLXC A removes the IP packet from within the SONET overhead bytes, and passes it to the router (at node A). The router processes the packet, and determines an appropriate route through the network (using topology and state information that has been propagated using OSPF link state advertisements). The calculated route has node B being the next along the route from node A. The router at node A finds that there is an empty OC-48 channel or an empty STS-48 slot in an OC-192 channel in link AB, allocates it, forwards the lightpath setup packet to B, and commands the OLXC to connect the input port PA-1 to the output port chosen on link AB. The packet is forwarded in turn to each router, where capacity is allocated on each link for the requested lightpath. Restoration routes are also calculated. In this example, this is done by the router at node A, which reserves the restoration capacity along the desired routes.

If any of the required capacity is not available, then a message is returned to the client (P) informing it that the lightpath cannot be established. A lightpath release message would then be sent from the router at node A to release any resources already allocated.

After successful lightpath establishment, the router at node A stores a mapping from the unique lightpath ID to the route and restoration selections, and to the customer identification. This information may also be passed to other network management systems including accounting and billing systems (albeit at a slower time-scale). For soft state lightpath maintenance, the setup procedure would be repeated periodically to maintain the soft state.

There are three aspects to restoration: reservation of restoration capacity, failure detection and exception handling and repair and return to primary lightpaths. Failures are a result of failed components.

One of the contributing factors in the success of the Internet is its self-healing property. Restoration of IP traffic can thus be performed at the IP layer as well as at the optical layer. IP level restoration is now described. Link and nodal failures are reflected in changes in topology and propagated throughout the network by routing protocols. As soon as a node learns that a link is not available (really that a set of hosts is no longer reachable through the failed link/node) it locally computes a new "best" path for destinations previously routed on the failed link. When the routing protocol converges and the update propagates closer to the sources, the forwarding paths become increasingly optimized (subject to the metrics and policies used). Internet routing protocols operate at time scales of tens of seconds. This is sufficient for overall network performance and has proven acceptable for best-effort data services. However, eventual restoration is unacceptable for real-time services, such as telephony, media-streaming and interactive services. Using SONET restoration, for example, connectivity is restored far more rapidly; e.g., in not more than a few hundreds of milliseconds.

To achieve fast restoration, while leveraging eventual restoration of IP routing and the robustness of existing Internet algorithms, restoration is performed in three steps, each step of increasing scope and at increasing time-scale. The first step is designed to react fast, but locally. Each node monitors its local equipment and its immediate neighbors, discovering local failures within, for example, a millisecond. This monitoring could be done by the IP layer (e.g., via IP packets, such as ICMP "pings" or "hello" messages continually transmitted along a link), or by a lower layer (e.g. optical layer). Immediately upon detecting a failure the node performs a local restoration, redirecting traffic away from the failed element using pre-computed or pre-calculated alternate (secondary) routes. Whereas some of the packets are simply sent to a different immediate neighbor, others are tunneled further away to avoid potential cycles. A variety of tunneling mechanisms can be used, including IP in IP tunnels, optical lightpaths, or layer 2 (e.g. MPLS) tunnels. IP routers can treat optical lightpaths as tunnels. The key observation is that routers recognize tunnels and are capable of routing into and receiving from tunnels. Typically a router lookup yields a pointer to an interface object representing the physical interface device. The router in the present invention uses a virtual interface that acts as a device driver for the optical lightpath while appearing as a normal interface to the router. This is similar to proposals on how to implement MPLS label switched paths.

In the second step (hundreds of milliseconds), the router then issues a limited scope alarm notification, alerting major upstream traffic contributors about the failure. The objective of this alarm is to relieve some of the overload at the node discovering the failure. The final step is performed by the traditional IP routing algorithms, which eventually optimize the overall network conditional on the surviving resources.

The previous restoration scheme assumes that traffic is IP, and restores data traffic at the IP layer. An alternative technique is to use optical layer restoration, in which a lightpath is restored within the optical layer. The restoration is thus transparent to the traffic carried on the lightpath.

When a restored lightpath is requested, the primary lightpath is established as described above, and the restoration capacity must be reserved. The extent to which a network provider chooses to protect the network depends on which failures can be recovered from. For purposes of discussion, it is assumed that recovery is guaranteed for all individual channel, link and single fiber span failures (i.e., links in a common SRLG). Specifically, restoration is guaranteed for all independent individual SRLG failures and restoration capacity is shared across independent SRLG failures. Recovery from node or multiple fiber span failures is not guaranteed. However, the technique proposed herein can be easily generalized beyond these assumptions.

The first-hop router selects the restoration route(s), and is responsible for reserving restoration capacity. Numerous policies may be used for determining the lightpath restoration routes. The choice of a good restoration policy is a tradeoff between simplicity, utilization and restoration speed. However, the calculations will have to determine the routes subject to the capacity that exists on each link in the network, the capacity allocated to primary lightpaths and the capacity reserved for restoration lightpaths. This requires that the Interior Gateway Protocols (IGPs) (OSPF/IS-IS) used for topology and resource discovery advertise total capacities, allocated capacities (for primary lightpaths) and reserved capacities on each link in the network.

The simplest approach is to restore only at the first-hop router using a single end-to-end route completely SRLG and node disjoint from the primary lightpath. When using a single end-to-end alternative route (lightpath) to restore from all failures along a primary route (lightpath), the single end-to-end alternative route is completely node and SRLG disjoint from the primary route. Such a disjoint route is sufficient for all failures along the primary route. Even if restoring only from the first-hop router, it may be preferable to use different restoration routes depending on which hop of the primary lightpath failed. However, for longer lightpaths the delay in exception propagation from the point of failure to the first-hop router may be too excessive, and thus it may be desirable to perform the restoration (handle the exception) at intermediate nodes along the path. The failure detection and exception handling mechanisms described below support all of these options.

The first-hop router stores all of the restoration routes for which it is responsible (i.e. for which it is the first hop of the primary lightpath) and calculates the total restoration resources required for these routes on each link in the network and for each different link failure, taking into account SRLGs and available resources. This calculation can be performed on-line using a greedy algorithm, thus optimizing the choice of restoration routes conditional on the existing lightpath allocations and reserved restoration capacity. Restoration capacity is reserved on a link for the failure of each single SRLG within the network. Thus, the number of lightpaths that use a given link for restoration will differ depending on which SRLG failure is considered. Restoration resources on a given link must thus be independently reserved for each different link failure within the network. The resources required by a first-hop router, s, on a given link, l, for restoration of a failed link i is denoted here by $r_{si}(l)$. Under soft state maintenance, the $r_{si}(l)$ values are transmitted to the links (l) at regular intervals and when restoration resource requirements are altered (i.e. for each arriving and departing restored lightpath). When using soft state bandwidth management, total restoration capacity reserved for a failure of a given SRLG within a reconfigurable optical network is the sum of all first-hop routers of the capacity required to support the failure of the given SRLG for all lightpaths (routes0 managed by each first-hop router. In a network with L links, this requires that O(L) values be transmitted to link l from first-hop router s. The resources reserved on a link for restoration are stored locally at that link. This implies the equivalent of storing a two dimensional array of information for each link l which documents the number of channels reserved at link l for each first-hop router and every possible link failure (i.e. requires that O(NL) values be stored, where N is the number of nodes/sources, and L is the number of links in the network). The total number of resources reserved on link l for restoration is the maximum over all possible fiber span failures (risk groups) of the sum over all first-hop nodes of restoration resources required on each link within the SRLG ($\max_j(\Sigma_s \Sigma_{i\ in\ SRLG\ j} r_{si}(l))$). This reserved restoration capacity should be advertised throughout the network via the IGPs (OSPF/IS-IS).

In the case where soft state maintenance is not used, the amount of information stored at each node can be reduced. If reliable delivery of messages is assumed, then the resources reserved at each node along a restoration route are updated only once (after the restoration route is chosen, not continually as with soft state). A one dimensional array is then stored for each restoration link l, to keep track of the resources required for the restoration of each different link (represented by $r_i$ for link i). This requires O(L) values, as opposed to O(NL) for soft state maintenance. The total number of resources reserved on link l for restoration is the maximum over all possible SRLGs of the sum over all links within each SRLG ($\max_j(\Sigma_{i\ in\ SRLG\ j} r_i(l))$).

Figure 3:
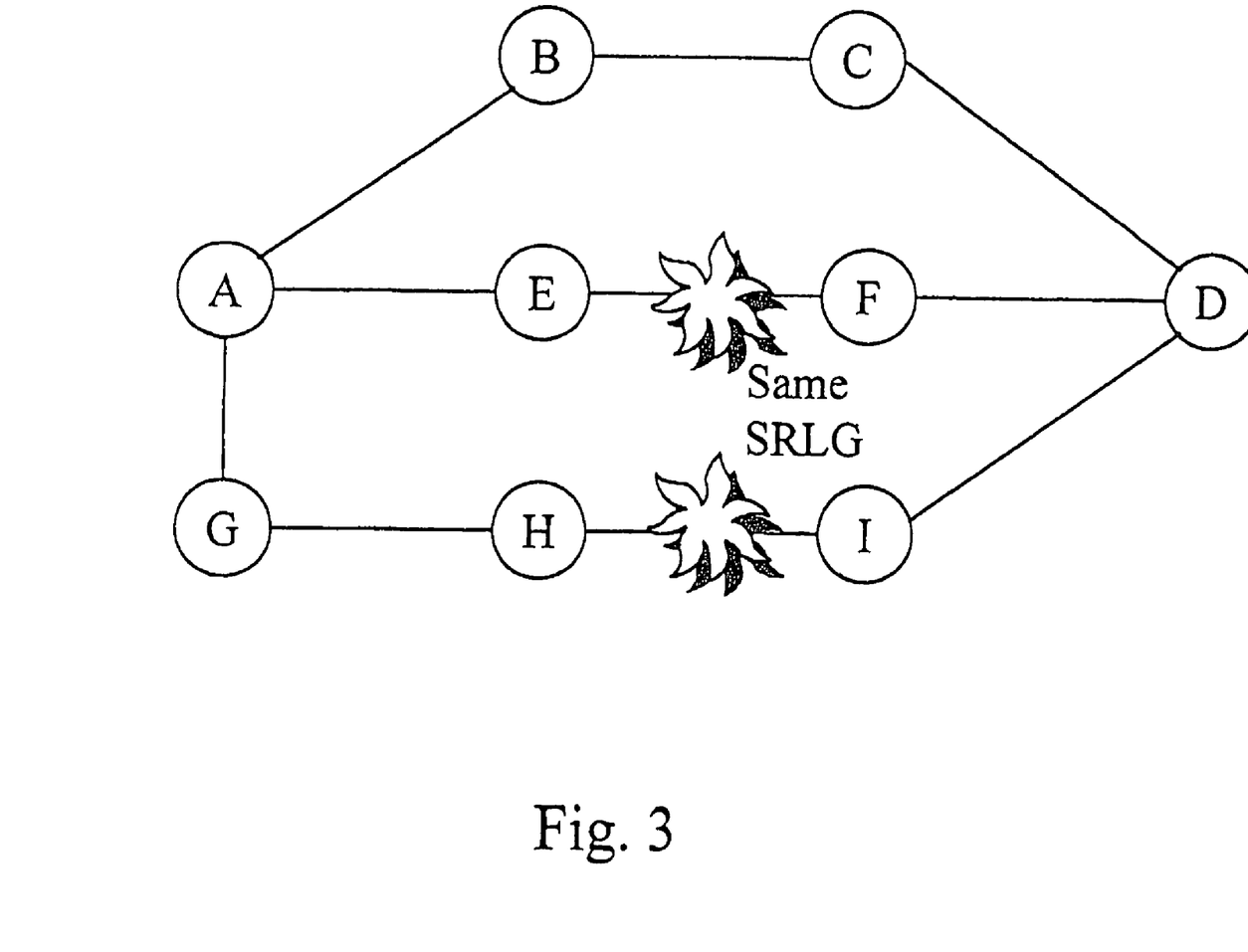
FIG. 3 illustrates a simple nine node network.

FIG. 3 illustrates a simple nine-node network. Two primary lightpaths are established between nodes A and D, and G and D, over routes A-E-F-D and G-H-I-D, respectively. Each lightpath requires a single channel on each link over the chosen routes. The first hop routers are A and G. The restoration routes for these lightpaths are A-B-C-D and G-A-B-C-D, respectively. It is assumed that all links are independent SRLGs, with the exceptions of links E-F and H-I. These two links are routed in a common conduit, and thus share a common SRLG. Now considering the restoration capacity on link B-C, for node A, $r_{A,E-F}(B-C)=1$ and for node G, $r_{G,H-I}(B-C)=1$ (assuming soft state maintenance). As links E-F and H-I are in the same SRLG, the two different r(B-C) values are summed to get a reserved restoration capacity on link B-C of two channels. Given that there are no other links which require restoration capacity on link B-C, a total of two channels are reserved for restoration on the B-C link.

Once restoration routes have been determined, a restoration reservation message (in IP packets) is sent to reserve the restoration capacity on the links along the chosen routes. This is performed in a manner similar to lightpath allocations using explicit routing, with the difference that while capacity is reserved, the OLXCs are not reconfigured. Instead, counts of reserved restoration capacity are updated at each of the links along the route. These counts are used to determine the amount of capacity, which must be reserved on each link for restoration.

As long as provisioning time-scales remain long, it is alternatively viable to do restoration management in a centralized fashion, where a centralized Risk Management Center assumes the responsibility for selecting and maintaining restoration routes. This center would subscribe to routing updates but would in addition need to be informed about the routes used for every lightpath established within the network. This last requirement becomes infeasible as timescales shrink.

The handling of failures in an optical network is equivalent to exception handling in advanced programming languages. Failures in optical networks are equated to exceptions. When a component receives an exception (at the lowest level detects a failure), it either handles the exception or escalates it up the chain of control. Locally, the chain of control goes from the router to the OLXC. For a lightpath the chain of control goes downstream through the routers. That is, setup and messages flow downstream while exception handling flows upstream. This means that exceptions get forwarded from the OLXC to the local router, from there to the upstream router, and then recursively to the router further upstream until the exception is handled.

This approach separates the mechanisms of exception propagation from the policy of deciding who and how the exception is handled, yielding great flexibility in the management of restoration capacity. In general, each lightpath is recovered independently. However, in some situations it may be desirable to handle multiple exceptions as a single unit. For example, if a fiber is cut, all channels may be restored in a single action.

Fiber cuts and other failures that affect all lightpaths over a given fiber can be detected locally from the IP layer. Using the routed lightpath (at least one on each fiber) the router simply pings (ICMP ECHO Requests) the other end of the link. In experimentation two thousand pings per second were sent. If two were lost, the link was deemed failed, resulting in detection in about 1 thousandth of a second. Clearly, these values are tuning parameters. Local detection of laser or receiver failures at intermediate cross-connects (e.g., opto-electronic) used by lightpaths that bypass the router, can only be done at the optical layer. In that case, the optical layer raises an exception that is still handled by the IP layer.

It is worth stressing that restoration capacity is reserved, and not allocated. The capacity reserved for restoration is therefore shared and not dedicated to any particular lightpath. The restoration capacity is either idle or is used for preemptable lightpaths. The use of preemptable lightpaths enables the use of a larger percentage of the total capacity albeit for secondary services. This is particularly attractive for adaptable services, as are common in the Internet, which would benefit from exploiting the restoration capacity under normal operating conditions, but would gracefully adapt to the reduction in capacity during failure.

Since restoration capacity is only reserved, handling the exception translates into allocating the restoration lightpath on failure. This requires efficient setup mechanisms for the construction and allocation of the restoration lightpath to meet the tight restoration timing constraints. Ideally the basic lightpath setup would be suitable for this purpose. Otherwise a separate mechanism must be devised for this purpose. In either case, it is essential to pre-compute and store the restoration routes. The advantage of using a fast lightpath setup is that a normal setup would be issued from the exception handler, allowing all lightpath specific state, specifically the restoration state, to be stored only at the nodes traversed by the primary lightpath. This significantly reduces the maintenance of the soft restoration state. However, other considerations may dictate which mechanisms are used for setting up the primary lightpath even if those mechanisms are poorly suited for restoration. For example, the processing of explicitly routed RSVP messages may be acceptable to setup primary lightpaths, but may be too costly for meeting restoration timing guarantees. To cope with this, the state for the restoration path may be pre-established along the restoration route, leaving out only the OLXC configuration. This way a simple allocation notification (a touch message) along the restoration path is sufficient to trigger the OLXC configuration. The notification can be forwarded by the router before it is processed, thus avoiding accumulating the processing overhead of each node, allowing for very rapid restoration setup. Data can then be transmitted on the restoration path immediately, with insignificant data loss. However, the pre-selection of restoration channels may significantly complicate overall network performance. In this case, the restoration messages will have to be processed at each node, and the channel selected before the message is forwarded to the next node along the route. However, the OLXC can be reconfigured after the channel has been selected and the message forwarded.

Note that the lightpath establishment message must distinguish between a restoration lightpath and a new lightpath request, so that restoration lightpaths allocate resources out of the pre-emptable capacity reserved for restoration.

Once a failed link or resource has been repaired, the restoration lightpath is released and the lightpath is restored on the original route. This responsibility is also delegated to the first-hop router, which periodically repeats the original lightpath request until it succeeds. For extended outages, the first-hop router may eventually give up on the primary path, and compute and allocate a new restorable primary route. Reverting back to the primary lightpath route after a failure requires that this capacity remain allocated during the time that the lightpath uses the restoration capacity. Soft connection states are assumed, so that if a lightpath refresh is not periodically received for an established lightpath, then its capacity will be de-allocated. This causes a problem in that these refresh messages will not be received along a primary route downstream of the failure. To overcome this problem, either a tunneling approach to bypass the failed node or an explicit notification to the closest node downstream of the failure is needed to temporarily reduce the available capacity to ensure that this capacity is not allocated to new lightpaths during the failure.

In all-optical networks or sub-networks, end-to-end restoration is complicated by the lack of wavelength converters. If no wavelength conversion is used in the network and on the client/network interface, then the same wavelength will be required for the primary and restoration lightpaths if the client cannot retune its wavelength on failure. Whether or not the client can provide this retuning can be passed as a parameter in the lightpath request.

Wavelength selection on the primary and restoration lightpaths should be simultaneously performed if the same wavelength is required on both of these lightpaths. This requires that the wavelengths available on both of the lightpaths be returned to the first-hop router, and a decision made before either lightpath is established. It also requires that specific wavelengths be reserved for restoration at each node, significantly increasing the state information required. The issue becomes even more complex in a hybrid transparent and opaque OLXC environment.

The methods and systems described herein perform the calculation of primary and restoration lightpath routes on-line as the individual requests arrive. The lightpath routes are thus chosen conditioned upon the existing lightpath allocations. A more optimal set of lightpath routes could be calculated off-line, with all of the requests known and their routes simultaneously calculated. However, as the lightpaths vary over time, the implementation of the "optimal" route choices would likely result in the reconfiguration of lightpath routes being required. Although a large number of lightpath reconfigurations may not be acceptable, it is possible that a limited number of lightpath reconfigurations could dramatically improve the network state, freeing up resources for future lightpath allocations.

For restored lightpaths, rerouting would generally have to be performed within the time limits set for restoration. The lightpath allocation schemes would either be fast enough to make this achievable, or additional mechanisms would be employed to hide the delay in lightpath construction. The number of reconfigurations that a given lightpath experiences should be limited, to ensure that lightpaths don't suffer a constant route fluttering. Lightpath reconfigurations should also be confined only to those lightpaths that are rearrangeable (as identified in the lightpath requests).

Restoration (secondary) routes can, however, be reconfigured without having to disturb established connections. A centralized controller would be able to re-optimize restoration routes off-line and distribute these new routes and reserve restoration capacity without disturbing connectivity. Significant improvements in network resource utilization could be achieved using this approach, in combination with the on-line approach described above. For example, optimization may result in releasing a portion of the reserved restoration capacity.

Topology information is distributed and maintained using standard routing algorithms. On startup/boot, each network node goes through neighbor discovery. By combining neighbor discovery with local configuration, each node creates an inventory of local resources and resource hierarchies, namely: channels, channel capacity, wavelengths, links, sub-links and SRLGs.

The following information should be stored at each node and must be propagated throughout the network as link state advertisements (e.g. via OSPF):

Representation of the current network topology and the link states, which will reflect the wavelength availability. This can be achieved by associating the following information with the link state:

an address for each node at each end of each link total number of active channels (note that if a laser fails, for example, then the channels using this laser become inactive, and are not counted in the total number of active channels)

number of allocated channels (non-preemptable)

number of allocated preemptable channels number of reserved restoration channels (maximum allocated over all potential link failures within the network)

Shared Risk Link Groups (SRLGs) throughout the network (i.e. which links share risk groups)

optional physical layer parameters for each link. These parameters are not expected to be required in a network with 3R signal regeneration, but may be used in all-optical networks.

All of the above information is obtained via OSPF or similar updates, and is propagated throughout the network.

Most of these parameters would be automatically discovered. However, some parameters, such as the SRLG information, may need to be inserted by external means. Once the local inventory is constructed, the node engages in the routing protocol.

Algorithms such as described herein could be used to accomplish distributed state maintenance. Note that nodes are not informed of which channels are available on a link. Thus, in networks with OLXCs without wavelength converters, decisions at the first-hop router are made without knowledge of wavelength availability. This is done to reduce the state information that needs to be propagated within the network.

In addition to this, extra information would be stored locally (i.e., not advertised throughout the network), such as IP routing tables and additional routing table information containing currently active lightpaths passing through, sourced or destined to this node and the channels to which they are allocated. For each link exiting the OLXC, the association between channels and fibers/wavelengths, total capacity (number of channels and their bandwidth), available capacity, pre-emptable capacity and the reserved capacity (the number of channels reserved for restoration on this link for each potential link failure within the network and for each first-hop router (if distributed restoration capacity calculations are being done)) would also be stored locally. Thus, if there are L links within the network and N nodes, then there are must be L*N unique values stored here for the reserve capacity. The association between channels and fibers/wavelengths is particularly important for OLXCs without wavelength converters and for OLXCs in which lower rate channels are multiplexed onto a common higher rate channel on a common fiber (e.g. four OC-48s multiplexed onto a single OC-192 for transmission). Additionally, for each client, the first-hop router maintains client identification, associated lightpath IDs for every established lightpath for this client and a set of primary and restoration routes associated with each lightpath ID.

Interface primitives such as the following for communication between the router and the OLXC within a node are necessary:

connect(input link, input channel, output link, output channel): commands sent from the router to the OLXC requesting that the OLXC cross-connect input channel on the input link to the output channel on the output link. Note that one end of the connection can also be a drop port. This is true for the following connection primitives as well.

disconnect(input link, input channel, output link, output channel): command sent from the router to the OLXC requesting that it disconnect the output channel on the output link from the connected input channel on the input link.

bridge(input link, input channel, output link, output channel): command sent from the router controller to the OLXC requesting the bridging of a connected input channel on input link to another output channel on output link.

switch(old input link, old input channel, new input link, new input channel, output link, output channel): switch output port from the currently connected input channel on the input link to the new input channel on the new input link. The switch primitive is equivalent to atomically implementing a disconnect(old input channel, old input link, output channel, output link) followed by a connect(new input link, new input channel, output link, output channel).

alarm(exception, object): command sent from the OLXC to the router informing it of a failure detected by the OLXC. The object represents the element for which the failure has been detected.

Note that IP packets are also passed by the OLXC to the router when the control packets from clients are transmitted within the framing overheads.

A novel approach to simplifying overall network architecture is by reducing the number of layers and putting each network function into a single layer, removing the current duplication of functionality in multiple layers. At the optical layer, WDM offers enormous bandwidth, and increasingly nimble capabilities for reconfiguration. At the networking layer, IP offers tremendous reach to end systems, and to new and innovative services. As capacities and capabilities grow rapidly in WDM and IP, it becomes increasingly appealing to bypass intermediate layer technologies, such as Frame Relay, ATM, and SONET, moving valuable functions (traffic engineering or load management and rapid restoration) of the intermediate layers either down to WDM or up to IP.

Figure 4A:
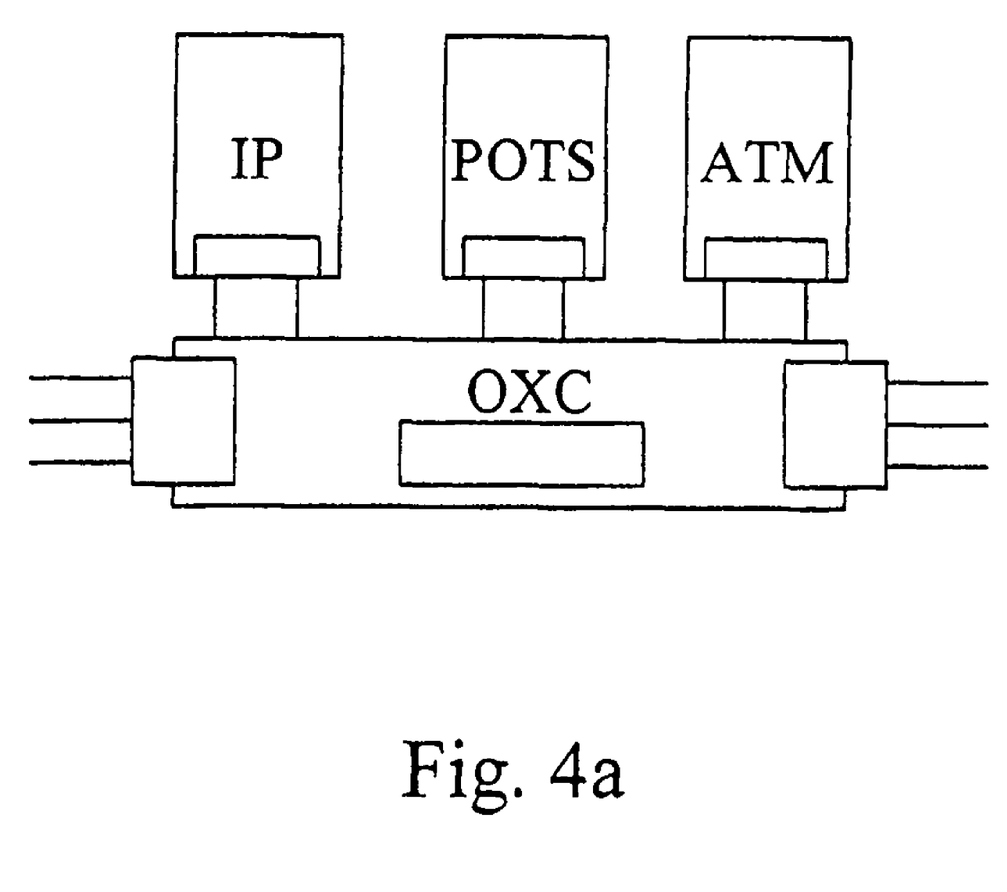
FIG. 4a depicts the traditional approach to bringing optical capacity to IP.

An IP/WDM architecture extends the conventional "overlay" approach, where each layer provides a virtual topology and a set of virtual network services to the layer above. An optimized version of this architecture avoids some of the intermediate layers and puts each of them directly onto a smart optical layer, as depicted in FIG. 4a. The optical layer is self-sufficient, implementing a complete set of control and signaling functions managing optical connectivity; e.g., configuration and capacity management, routing, topology discovery, exception handling and restoration. At the other end of the spectrum of IP/WDM design is the "big fat router" (BFR) architecture (FIG. 4c), where each node is simply a router, terminating all available wavelengths at each port. This architecture requires no intelligent optical connectivity management. WDM just provides a number of parallel optical channels between directly connected routers. Here, we consider an alternative approach, which we term a Smart Router-Simple Optics (SRSO) architecture, illustrated in FIG. 4b. The SRSO approach concentrates intelligence for resource management in the IP layer; optical resource management is provided through a thin API (Application Programming Interface). The SRSO approach is characterized by a slim interface to optical configuration, with intelligence for optical connectivity moved up to the IP layer and "Other Data" representing non-IP services.

A drawback of the overlay approach in FIG. 4a is that IP already provides the complex logic similar to those the smart optical controller would attempt to provide. In addition, IP is rapidly being extended to exploit connection oriented infrastructures (e.g., MPLS). These extensions overlap with the functionality provided by smart optical layer control. Some of the lessons learned from supporting IP over ATM are that the functions of intelligent layers often conflict due to differences in policies and service objectives. BFRs exploiting WDM avoid these problems, and are now appearing in the marketplace. However, a drawback of the BFR approach is that it couples the capacities of the electronics with those of the optics. It appears that the rate of growth in capacity in the two technologies is not identical (optical capacity appears to grow faster).

The SRSO approach interworks IP and WDM, attempting to leverage the strengths of each. Some of the most complex functions in network control and management are addressing, routing, and the management of topology and network resources. With the dominance of the Internet, the vast majority of research and development on these topics is conducted within the context of IP. On the other hand, the focus of the optical community has been on enormous capacity, and on reconfigurable optical cross-connects. The present invention exploits these trends and avoids duplication by concentrating intelligence for resource management in the IP layer. To manage optical connectivity in SRSO, IP requires certain extensions as have been defined and described above. The extensions defined and described herein above are applicable to both the big router (with OLXC ultra-fast forwarding engine) and the optical control plane (IP used as a controller for OLXC). Architectural choices are not unlike those encountered in MPLS. A few simple abstractions provide the basic building blocks needed, the simplest and most powerful being the IP tunnel.

Figure 5:
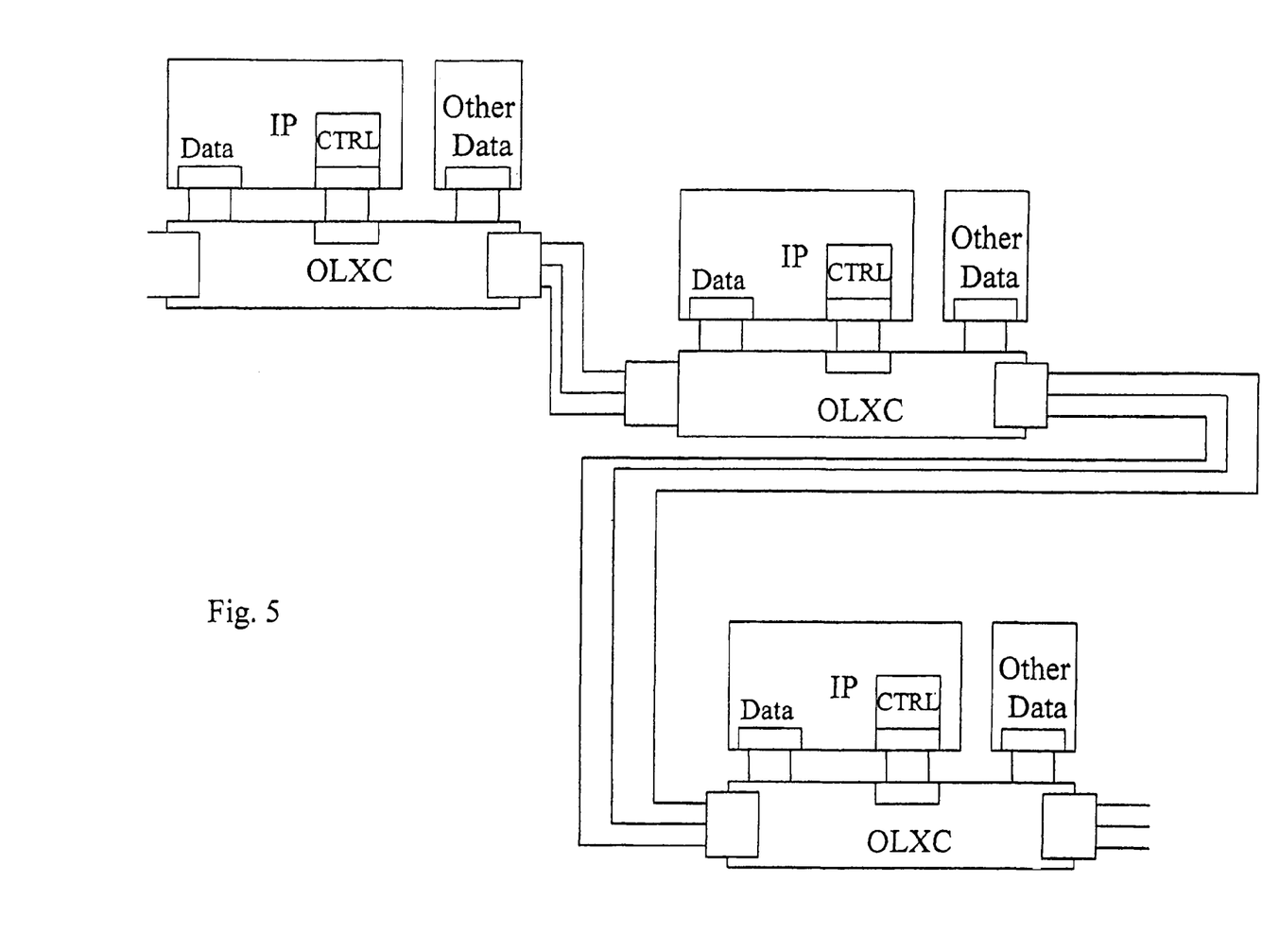
FIG. 5 is a simple three node SRSO network.

FIG. 5 illustrates a simple three-node SRSO network that supports both IP traffic and non-IP traffic (denoted "Other Data" in the figure). The SRSO node may be implemented using a standalone router interfacing with the OLXC through a defined interface as illustrated in FIG. 5, or may be an integrated system. In the non-integrated case, the IP router uses a separate communications channel established between the router and the OLXC to convey reconfiguration commands to the OLXC (e.g., the connect, disconnect commands described above) and to pass alarms from the OLXC to the router (described above).

Figure 4B:
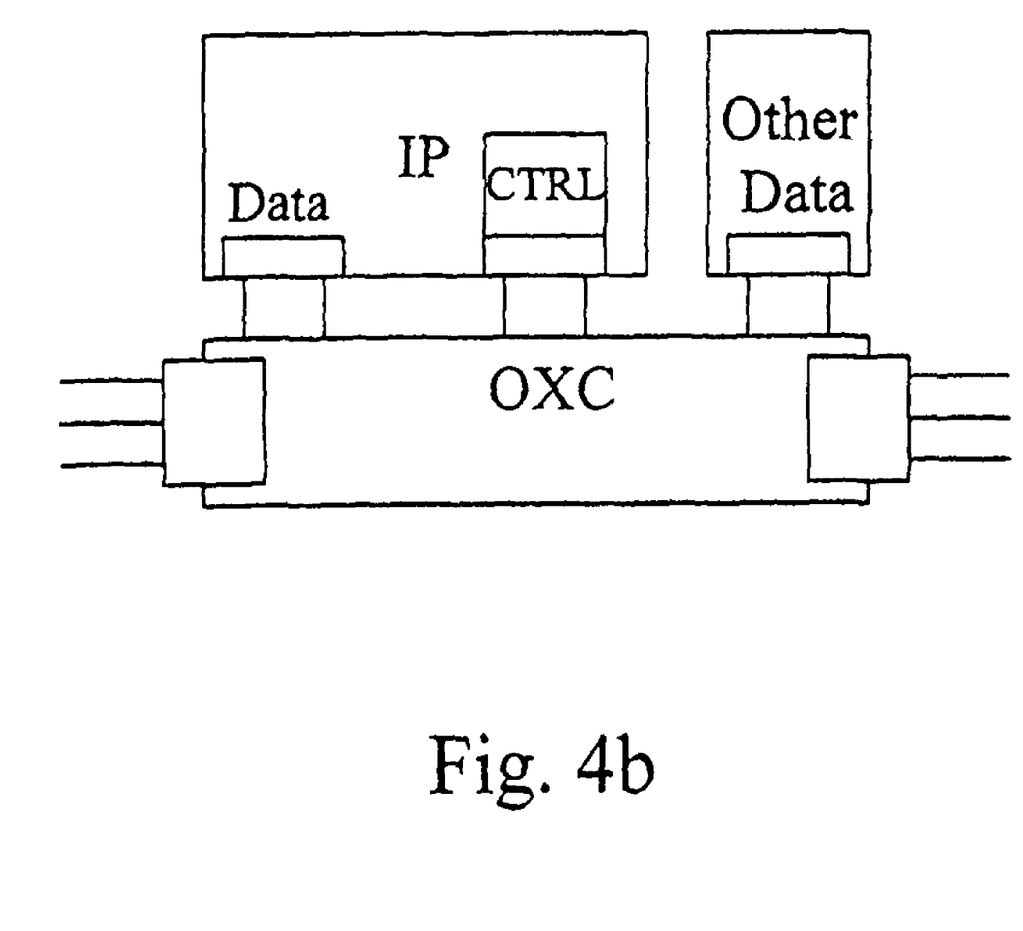
FIG. 4b depicts the Smart Router-Simple Optics (SRSO) approach.
Figure 4C:
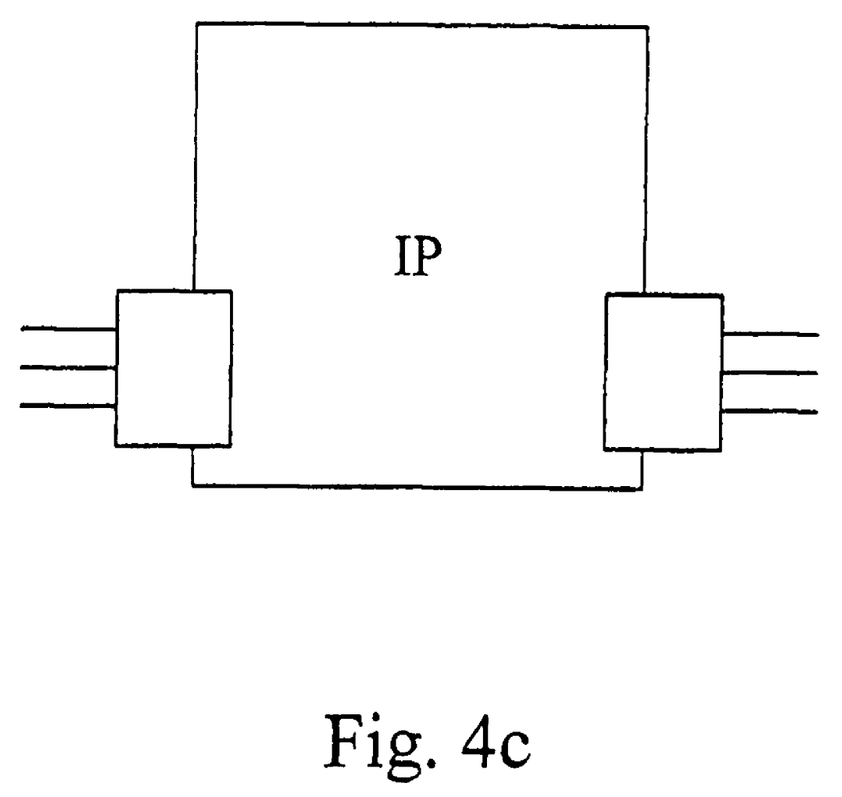
FIG. 4c depicts a "Big Fat Router".

The salient feature of the novel network architecture described herein, is that every node in the network consists of a router and an optical cross-connect (FIG. 4b). This architecture promotes simplicity as the primary design objective, with the IP layer running directly over the optical infrastructure. The IP router owns the optical resources and controls their use. The optical layer is therefore not a complete autonomous virtual network layer, but simply provides capacity and capabilities that the router exploits. The optical layer provides capacity, dynamic connectivity via switched optical paths, and possibly transparent optical services. Specifically, the IP router is responsible for all complex functions, including addressing, routing and global topology discovery, and is responsible for network optimality including traffic engineering and QoS, management of optical resources (i.e., wavelength allocation), and restoration. While the IP layer delegates work to the optical layer, the IP layer owns the optical resources, and retains the responsibility for their allocation and management. The optical layer thereby reduces the load on the IP routers, reducing size and number of ports required on the routers. At the same time, the SRSO architecture concentrates the intelligence for the optical layer into the IP routers and thus avoids the complexity of multiple intelligent layers with duplication of functionality and potentially conflicting policies. The result is a very simple optical layer, responsible only for providing transmission services: MAC-level framing, dynamic optical connectivity, and physical transmission. While controlled by the IP layer, the architecture supports point-to-point lightpaths being established for non-IP services, such as ATM traffic.

There are three primary challenges in realizing this architecture: (1) to economically build optical cross-connects that compete with a BFR solution in practical settings; (2) to enhance the IP layer to exploit the optical layer for traffic engineering so as to provide consistent service quality; and (3) to perform fast restoration of optical connectivity at the IP layer. Economical production of OLXCs is now within reach. New functions, such as those described above, are needed in the IP layer to account for optical resources and to perform risk evaluation and management. However, by moving these to the IP layer, or more precisely to the application layer in IP routers, the restoration management becomes a particular part of the resource and service quality management. This approach will foster an evolution of restoration services that is independent of the physical network in much the same way that a multitude of routing protocols have evolved on the Internet.

Described above herein is how IP algorithms and mechanisms can be used as the basis for a control plane for an optical network. The above illustrates how optical lightpath management, and particularly rapid lightpath provisioning and restoration can be implemented using IP control. Also described herein is the novel Smart Router-Simple Optics (SRSO) network architecture, where each node controls a smart IP router and a simple optical cross-connect. The SRSO architecture leverages growth and innovation in IP and optics to their fullest. That is, the extensions described in the present invention are applicable to both the big router (with OLXC ultra-fast forwarding engine) and optical control plane (IP used as controller for OLXC).

While the present invention is described using IP control of an optical communications network embodiment, it is not deemed a departure from the spirit and scope of the present invention to apply the fundamental novel concepts to a similarly configured communications network.

The present invention may be implemented in hardware, software or firmware as well as Application Specific Integrated Circuits (ASICs) or Field Programmable Gate Arrays (FPGAs) or any other means by which the functions and process disclosed herein can be effectively and efficiently accomplished or any combination thereof. The above means for implementation should not be taken to be exhaustive but merely exemplary and therefore, not limit the means by which the present invention may be practiced.

It should be clear from the foregoing that the objectives of the invention have been met. While particular embodiments of the present invention have been described and illustrated, it should be noted that the invention is not limited thereto since modifications may be made by persons skilled in the art. The present application contemplates any and all modifications within the spirit and scope of the underlying invention disclosed and claimed herein.

What is claimed is:

1. A method for removing a lightpath from an optical layer cross-connect configured by a soft state at a node in a reconfigurable optical network, the method comprising:

refreshing the soft state in response to receiving, at an Internet Protocol router, refresh message Internet Protocol datagrams at refresh intervals, each refresh interval having a refresh period, wherein refreshing the soft state comprises re-executing a procedure to setup the lightpath;

determining whether the soft state has expired after a first time-to-live value, wherein the first time-to-live value is a first multiple of a first refresh period;

upon determining that the soft state has expired after the first time-to-live value, removing the lightpath from the optical layer cross-connect; and upon determining that the soft state has not expired after the first time-to-live value, increasing the refresh period to a second refresh period, wherein the second refresh period is greater than the first refresh period.

2. The method of claim 1, further comprising:

determining whether the soft state has expired after a second time-to-live value, wherein the second time-to-live value is a second multiple of the second refresh period;

upon determining that the soft state has expired after the second time-to-live value, removing the lightpath from the node; and upon determining that the soft state has not expired after the second time-to-live value, increasing the refresh period to a third refresh period, wherein the third refresh period is greater than the second refresh period.

3. The method of claim 2, further comprising:

increasing the refresh period to a predefined maximum.

4. The method of claim 2, further comprising:

exponentially increasing the refresh period to a predefined maximum.

5. A system for removing a lightpath from an optical layer cross-connect configured by a soft state at a node in a reconfigurable optical network, the system comprising an Internet Protocol router configured to:

refresh the soft state in response to receiving refresh message Internet Protocol datagrams at refresh intervals, each refresh interval having a refresh period, wherein refreshing comprises re-executing a procedure to setup the lightpath;

determine whether the soft state has expired after a first time-to-live value, wherein the first time-to-live value is a first multiple of a first refresh period;

remove the lightpath from the optical layer cross-connect, upon determining that the soft state has expired after the first time-to-live value; and increase the refresh period to a second refresh period, wherein the second refresh period is greater than the first refresh period, upon determining that the soft state has not expired after the first time-to-live value.

6. The system of claim 5, wherein the Internet Protocol router is further configured to:

determine whether the soft state has expired after a second time-to-live value, wherein the second time-to-live value is a second multiple of the second refresh period;

remove the lightpath from the node, upon determining that the soft state has expired after the second time-to-live value; and increase the refresh period to a third refresh period, wherein the third refresh period is greater than the second refresh period, upon determining that the soft state has not expired after the second time-to-live value.

7. The system of claim 6, wherein the Internet Protocol router is further configured to:

increase the refresh period to a predefined maximum.

8. The method of claim 6, wherein the Internet Protocol router is further configured to:

exponentially increase the refresh period to a predefined maximum.

* * * * *